United States Patent [19]
Jaberi et al.

[11] Patent Number: 5,880,710
[45] Date of Patent: Mar. 9, 1999

[54] ADAPTIVE VEHICLE DISPLAY

[75] Inventors: Sam H. Jaberi, Peoria Heights; J. Martin Hadank, Dunlap, both of Ill.

[73] Assignee: Caterpillar Inc., Peoria, Ill.

[21] Appl. No.: 162,820

[22] Filed: Dec. 3, 1993

Related U.S. Application Data

[63] Continuation of Ser. No. 987,093, Dec. 7, 1992, abandoned, which is a continuation of Ser. No. 579,015, Sep. 7, 1990, abandoned.

[51] Int. Cl.$^6$ ..................................................... G09G 5/00
[52] U.S. Cl. .......................... 345/117; 345/40; 340/461; 340/519
[58] Field of Search ................................. 345/35, 39, 40, 345/117, 112, 214; 340/459, 461, 519, 517, 521, 462, 525, 518, 520; 364/141, 140, 188

[56] References Cited

U.S. PATENT DOCUMENTS

| | | | |
|---|---|---|---|
| 4,015,237 | 3/1977 | Takatani et al. | 340/519 |
| 4,035,764 | 7/1977 | Fujinami et al. | 340/459 |
| 4,072,924 | 2/1978 | Pomerantz | 345/112 |
| 4,072,925 | 2/1978 | Yashima et al. | 340/461 |
| 4,197,650 | 4/1980 | Bailey et al. | 340/754 |
| 4,287,504 | 9/1981 | Simon et al. | 340/52 |
| 4,401,971 | 8/1983 | Saito et al. | 340/519 |
| 4,442,424 | 4/1984 | Shirasaki et al. | 340/701 |
| 4,470,011 | 9/1984 | Masuda | 324/166 |
| 4,551,801 | 11/1985 | Sokol | 340/684 |
| 4,609,918 | 9/1986 | Nakanishi et al. | 340/754 |
| 4,617,562 | 10/1986 | Klotz | 340/753 |
| 4,688,029 | 8/1987 | Kawasaki et al. | 340/753 |
| 4,748,843 | 6/1988 | Schafer et al. | 73/117.3 |
| 4,787,039 | 11/1988 | Murata | 340/461 |
| 4,815,824 | 3/1989 | Sharples | 340/753 |
| 4,862,395 | 8/1989 | Fey et al. | 340/754 |
| 4,868,496 | 9/1989 | Havel | 340/753 |
| 4,890,088 | 12/1989 | Woodell | 340/461 |
| 4,954,807 | 9/1990 | Fleischer et al. | 340/459 |
| 5,006,829 | 4/1991 | Miyamoto et al. | 340/459 |

FOREIGN PATENT DOCUMENTS

| | | |
|---|---|---|
| 0005436A1 | 11/1979 | European Pat. Off. . |
| 0041741A1 | 12/1981 | European Pat. Off. . |
| 0072000A3 | 2/1983 | European Pat. Off. . |
| 0225971A2 | 6/1987 | European Pat. Off. . |
| 0345992A1 | 12/1989 | European Pat. Off. . |
| 0376206A2 | 7/1990 | European Pat. Off. . |
| 3837592A1 | 5/1990 | Germany . |
| 0107109 | 6/1985 | Japan .................. 340/722 |

*Primary Examiner*—Regina Liang
*Attorney, Agent, or Firm*—Alan J. Hickman

[57] ABSTRACT

In the field of engine-powered vehicles is desirable to monitor vehicle operating parameters and provide a vehicle operator with an indication when the monitored parameters enter undesirable operating conditions. It is further desirable in many instances to provide a visual indication of the relative magnitude of the sensed parameter which is in an undesirable operating condition. The subject invention provides an apparatus for monitoring the operating condition of a vehicle of the type having a plurality of sensor devices for sensing separate vehicle parameters and producing respective parameter signals responsive to the sensed parameters. The apparatus includes a processor means for receiving the parameters signals, processing each of the parameter signals to determine if the associated sensed parameter is in an undesirable operating condition, and producing respective display control signals in response to the parameter signals indicating undesirable operating conditions for the sensed parameters, respectively. The apparatus further includes a display device for receiving the display control signals and sequentially providing a visual indication of the magnitude of each sensed parameter which is in an undesirable operating condition in response to the display control signals.

9 Claims, 4 Drawing Sheets

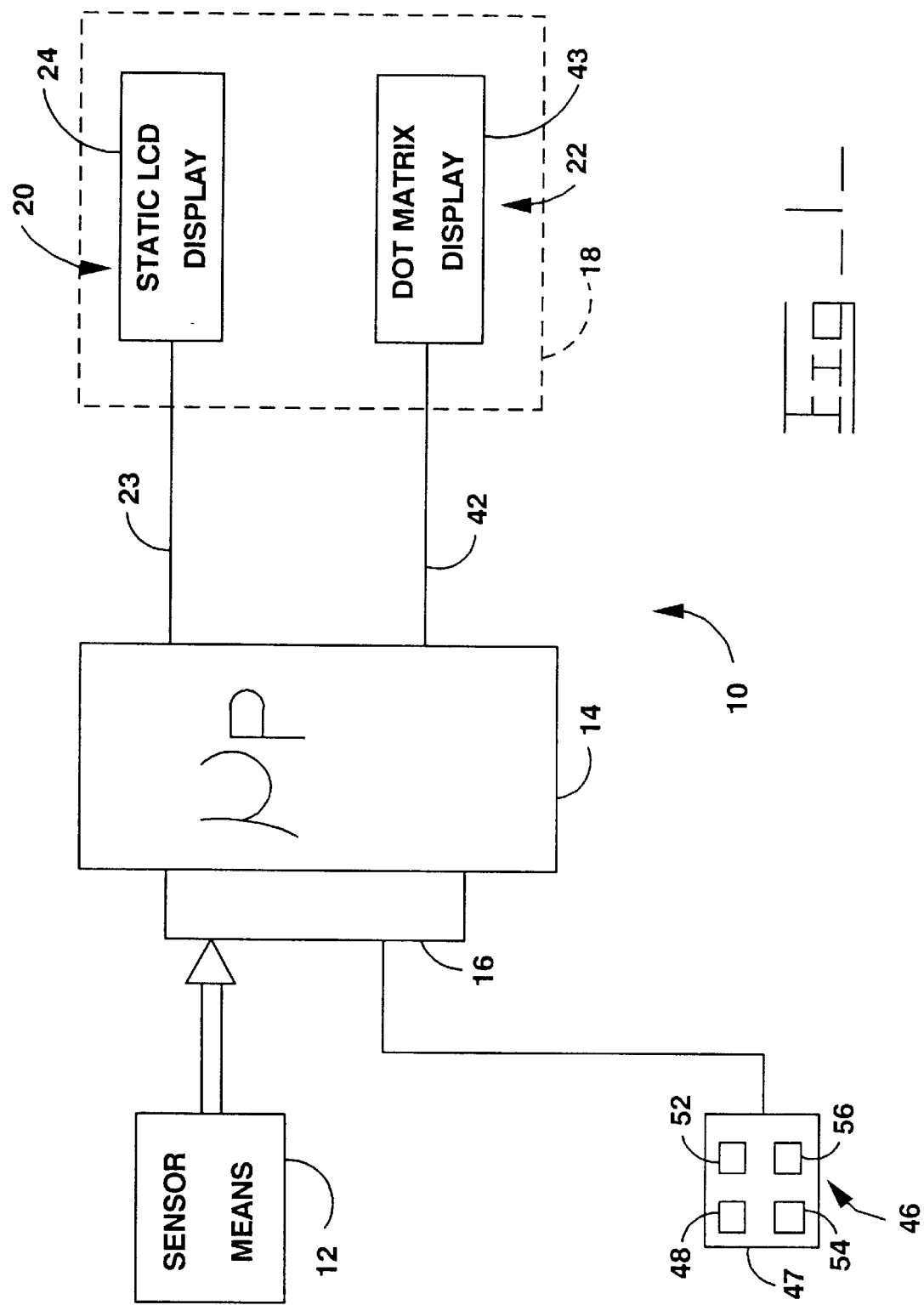

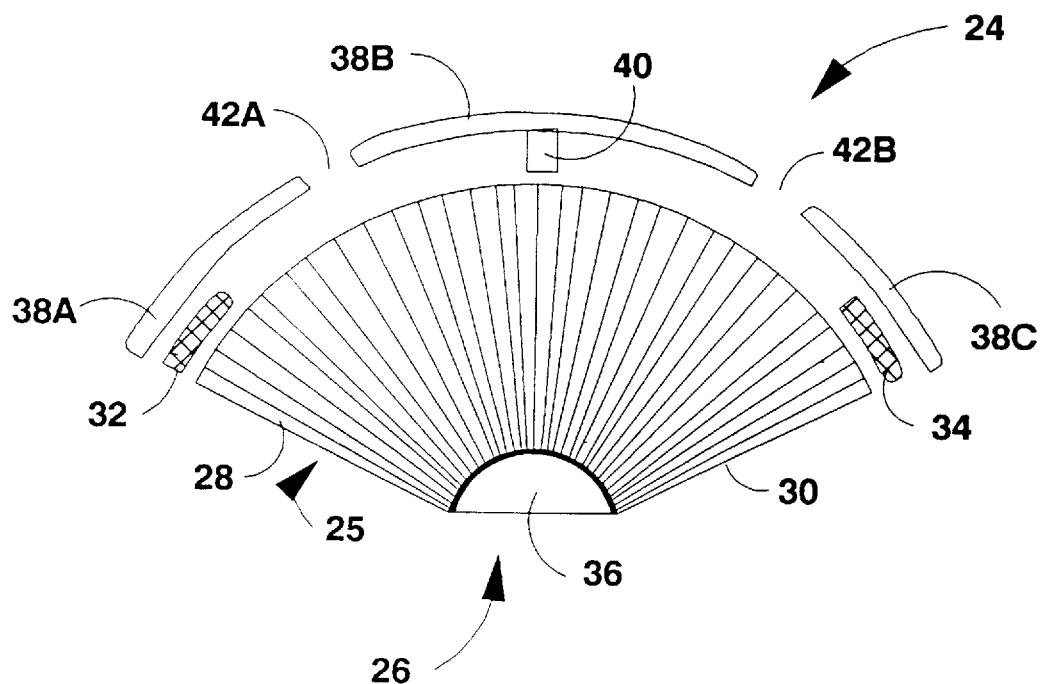
Fig_2A_
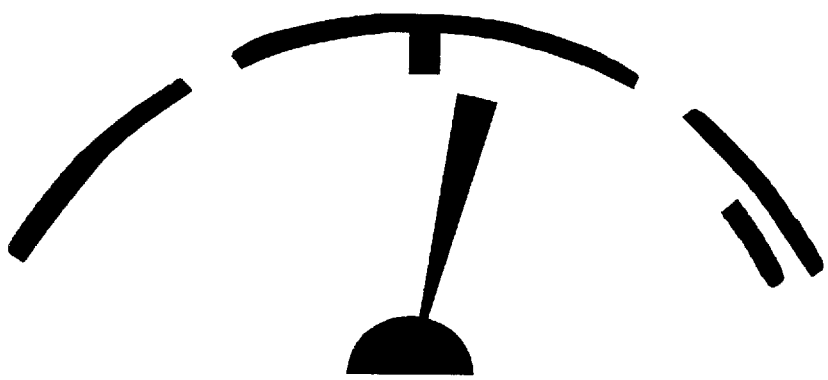
Fig_2B_

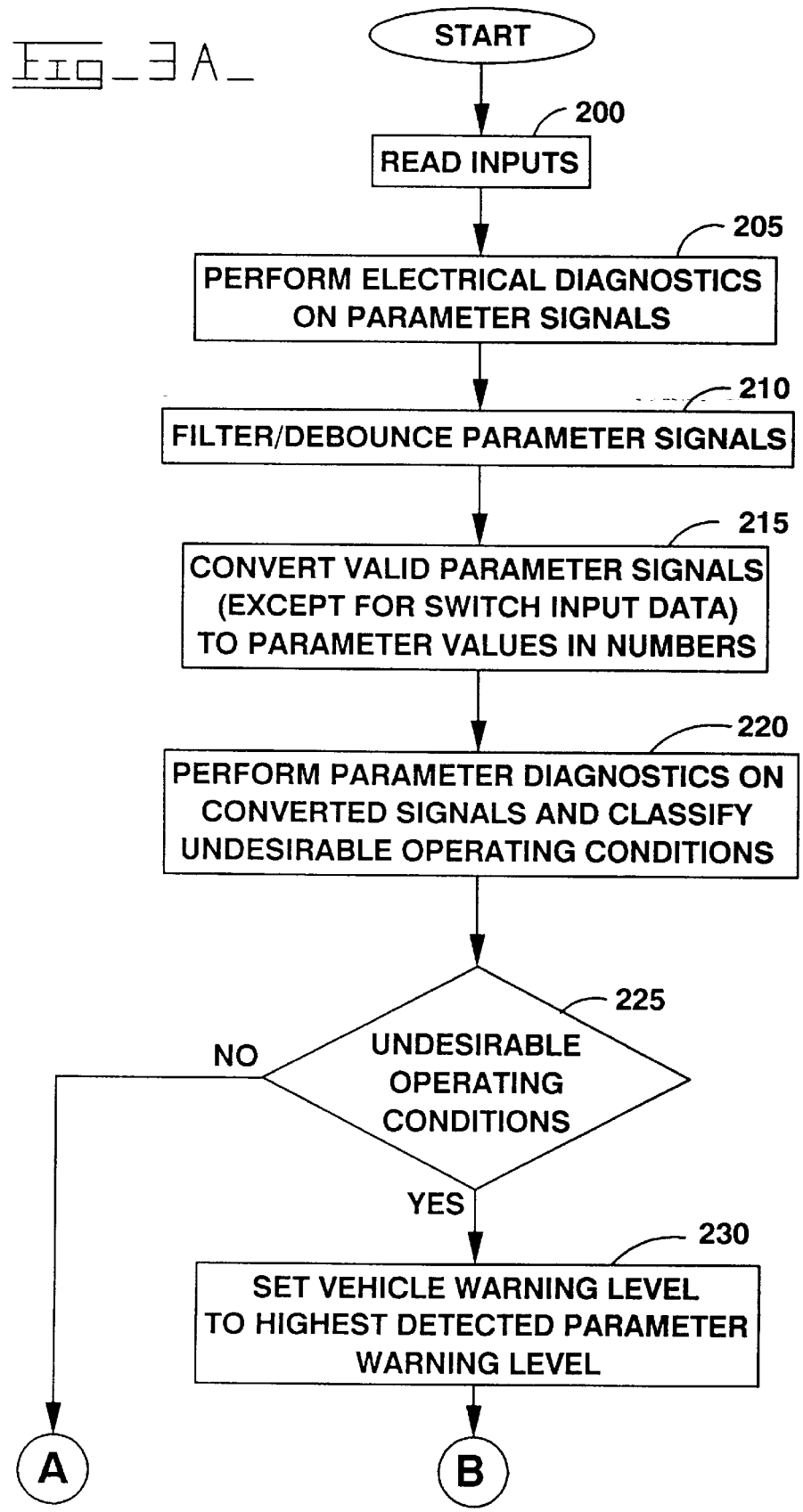
Fig_3A

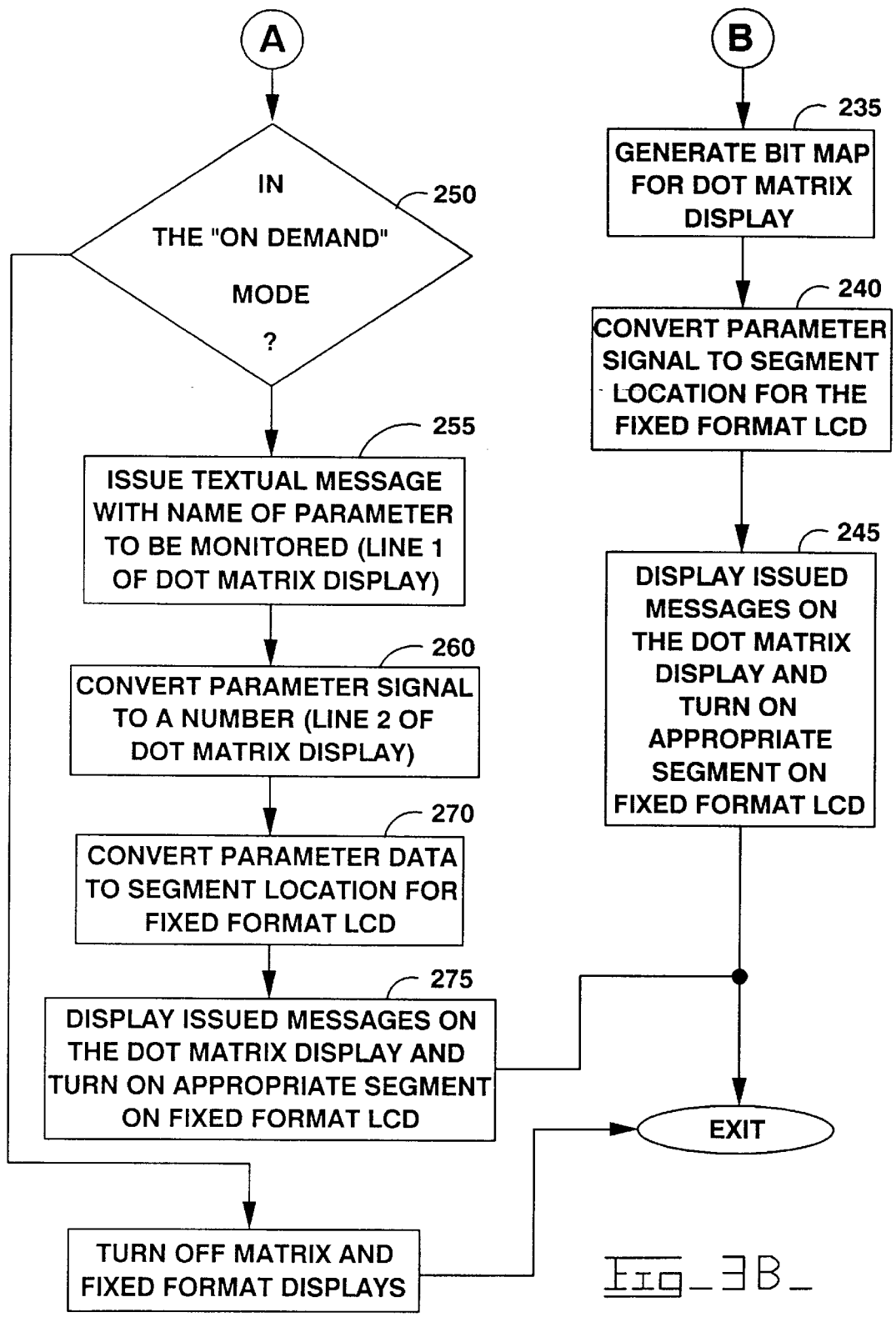
Fig_3B

ADAPTIVE VEHICLE DISPLAY

This is a continuation of application Ser. No. 07/987,093, filed Dec. 7, 1992, now abandoned, which was a continuation of abandoned application Ser. No. 07/579,015, filed Sep. 7, 1990.

TECHNICAL FIELD

This invention relates to a monitor system for a vehicle wherein the presence of undesirable operating conditions of the vehicle is detected and warnings are given to the operator.

BACKGROUND ART

In a variety of engine-powered vehicles, monitoring devices are employed to detect the presence of various undesirable operating conditions, such as over heating of the engine, low oil pressure, low fuel and the like, and indicators are provided to warn the operator of such conditions.

The importance of the various monitored conditions usually varies as to criticality. For example, the air filter for the engine or the filter for the hydraulic fluid may gradually clog during operation of the vehicle. The vehicle operator should be warned of such clogging, but generally there is no need to remedy the situation until the end of the day when the vehicle returns for normal servicing and maintenance. A low fuel condition requires more immediate attention from the operator. A loss of engine oil pressure or a loss of hydraulic fluid represent conditions which require immediate operator attention to prevent damaging the vehicle.

Prior monitoring systems have detected the presence of undesirable conditions and then signaled the vehicle operator by means of dial indicators, indicator lamps, or audible means. The efficiency of these systems greatly depend upon the operator's careful attention to all of the various indicators and upon his judgement as to which may call for immediate correction. As the complexity of a vehicle increases, the number of monitored parameters generally increases. Therefore, the operator is required to direct more attention to the increasing number of indicators, and less attention to operating the vehicle.

U.S. Pat. No. 4,184,146, which issued to Fratzke et al. on Jan. 15, 1980 and is assigned to the assignee herein, recognizes and partially addresses the above problems. Fratzke et al. provides a system for warning a vehicle operator of an undesirable operating condition of one or more of a plurality of monitored operating parameters of an engine-powered vehicle. Three degrees of warning are given, depending upon the criticality of the monitored parameter. Individually energizable low-intensity warning indicators are provided for each of the monitored parameters, and a multiplexing circuit is provided for staggered pulsing of the indicators. The existence of any critical fault will cause an intermittent operation of a more intense warning device, while the existence of a highly critical fault results in an additional intermittent warning of a still greater degree of intensity.

Since the invention of the Fratzke et al. system, vehicles have become much more complex and the number of vehicle parameters requiring monitoring has increased dramatically. In Fratzke et al. and other prior systems, an increasing number of monitored parameters results in an increased number of warning indicators. However, increasing the number of indicators on a vehicle is undesirable from both an economic and operator standpoint.

Furthermore, in many instances it is desirable to provide an indication of the relative magnitude of the parameters which are in an undesirable condition. For example, in the instance of low oil pressure, it is desirable to provide an indication of the relative magnitude of the actual oil pressure. In order to provide an indication of this type, past systems have utilized separate indicators, such as dial indicators, for each monitored parameter which is to be displayed. Again this is undesirable because it adds to the cost of the vehicle and requires greater attention on the part of the vehicle operator. Hence, many prior systems only provide such an indication for a few selected parameters, such as fuel level, oil pressure, and engine temperature. However, it is desirable to provide such an indication for any monitored parameter which enters an undesirable condition without increasing the number of indicators on the vehicle. It is further desirable to provide a display which indicates the relative magnitude of selected parameters in the absence of any undesirable operating conditions.

The present invention is directed towards overcoming one or more of the problems as set forth above.

DISCLOSURE OF THE INVENTION

In one aspect of the present invention, an apparatus is provided for monitoring the operating condition of a vehicle of the type having a plurality of sensing devices for sensing separate vehicle parameters and producing respective parameter signals responsive to the sensed parameters. The apparatus includes a processor for receiving the parameter signals, processing each of the parameter signals to determine if the associated sensed parameter is in an undesirable operating condition, and producing respective display control signals in response to the parameter signals indicating undesirable operating conditions for the sensed parameters, respectively. A display device is provided for receiving the display control signals and sequentially providing a visual indication of the magnitude of each sensed parameter which is in an undesirable operating condition in response to the display control signals.

In another aspect of the present invention, an apparatus is provided for monitoring the operating condition of a vehicle of the type having a plurality of sensor devices for sensing vehicle parameters and producing respective parameter signals responsive to the sensed parameters. The apparatus includes a processor for receiving the parameter signals and processing each of the parameter signals to determine if the associated sensed parameter is in an undesirable operating condition. The processor is further operative for classifying each of the undesirable operating conditions into one of a preselected number of warning levels in accordance with the severity of the respective undesirable operating condition, determining the highest warning level for which an undesirable operating condition currently exists, and sequentially producing display control signals responsive to each of the parameter signals which has the highest current warning level. A display device is provided which includes a first display for receiving the display control signals and sequentially providing a visual indication of the relative magnitude of each sensed parameter which has the current highest warning level in response to the display control signals. The first display device includes a liquid crystal display having a plurality of radially oriented segments which are selectively energized in response to the display control signals. The display device further includes a second display adapted to indicate which sensed parameter is currently displayed on the first display and what action should be taken in response to the undesirable operating condition of the displayed parameter.

BRIEF DESCRIPTION OF THE DRAWINGS

FIG. 1 is an illustrative diagram of one embodiment of the immediate vehicle monitoring;

FIGS. 2A–B are further illustrations of particular portions of FIG. 1; and

FIGS. 3A–B illustrate a functional software flowchart for one embodiment of the present invention.

BEST MODE FOR CARRYING OUT THE INVENTION

Referring now to the drawings, FIG. 1 illustrates one embodiment of the immediate vehicle monitoring system 10. While the monitoring system 10 is described in connection with a vehicle, it should be understood that it is within the scope of the invention to use the monitoring system 10 in other applications where a variety of parameters require monitoring, such as engine-powered electrical generator units. The monitoring system 10 operates in connection with a plurality of sensor means, indicated generally by reference number 12, which sense various vehicle parameters such as engine coolant temperature, hydraulic fluid pressure, and engine speed, and responsively produce respective parameter signals. The sensor means 12 can be embodied in a variety of commercially available sensors such as pressure transducers, coolant sensors, magnetic pick-up sensors, etc. The parameter signals can include, but are not limited to, pulse width modulated (PWM), frequency, and analog signals. It should be understood that the various parameter signals could also be obtained from other vehicle control and monitoring systems (not shown) such as payload monitors, engine control systems, etc. which are commonly present on engine-powered vehicles.

The parameter signals are delivered to a processor means 14 through appropriate conditioning and interface circuits 16, as would be apparent to one skilled in the art. A number of commercially available devices are adequate to perform the functions of the processor means 14; however, in the preferred embodiment the processor means 14 includes a series MC68000 microprocessor operating in combination with and a model MC68HC11, both of which are manufactured by Motorola, Inc.

The processor means 14 operates under software control for receiving the parameter signals and processing them in a manner set forth below. More specifically, the processor means 14 operates on each of the parameter signals to determine if the associated sensed parameter is in an undesirable operating condition and responsively delivers display control signals to a display means 18 for displaying the relative magnitude of sensed parameters having undesirable operating conditions. The processor means 14 performs diagnostics on the parameter signals to detect electrical and sensor faults and responsively sets respective faulty data flags in memory. The processor means 14 further performs diagnostics on the parameter signals to detect undesirable operating conditions in the sensed parameters. The parameter diagnostics are not performed on parameter signals for which faulty data flags have been set, because this data is assumed to be inaccurate owing to the detected electrical fault. The exact nature of the parameter diagnostics form no part of the immediate invention and, therefore, will not be explained in great detail. An example of the typical diagnostics performed is analyzing the parameter signal corresponding the engine temperature to determine if the engine is in an overheat condition.

Upon determining that undesirable operating conditions exist, the processor means 14 classifies each of the undesirable operating conditions into one of a preselected number of warning levels in accordance with the severity of the respective undesirable operating condition. More specifically, the monitoring system 10 provides for three levels of warning depending on the criticality of the monitored condition. However, it would be within the scope of the present invention to use fewer or greater than three warning levels if desired. These warning levels will hereinafter be referred to as warning levels 1, 2, and 3, where the levels correspond respectively to low level, intermediate, and high levels of criticality of the associated undesirable operating condition. The processor means 14 sets a parameter warning level flag in memory (not shown) for each parameter having an undesirable operating condition in accordance with the severity of the detected undesirable operating condition. The parameter warning level flag indicates that a parameter is in an undesirable operating condition as well as the warning level associated with the undesirable condition. It should be understood that a given sensed parameter may have different warnings at all three levels in dependence on the current magnitude of the sensed parameter. For example, in the case of engine temperature the warning level may be set at levels 1, 2, or 3 in dependence on the current sensed engine temperature.

The processor means 14 then determines the highest warning level for which an undesirable operating condition currently exists and sets a vehicle warning level flag in memory in accordance with the highest detected warning level. The processor means 14 sequentially produces respective display control signals responsive to each sensed parameter which is at the vehicle warning level, excluding those exceptions set forth above. For example, if undesirable conditions are present at all three warning levels, the processor means 14 will only produce display control signals for parameters at warning level 3. Operation of the vehicle warning level flag will be explained in greater detail below.

The display means 18 receives the display control signals and provides a visual indication of the relative magnitude of each sensed parameter which has the current highest warning level in response to receiving the display control signals. The parameters are displayed sequentially on the display means 18 in response to the sequential production of the display control signals by the processor means 14. It should be understood that if the monitoring system 10 only provided for one level of warning, the display means 18 would sequentially display the relative magnitude of each sensed parameter having an undesirable operating condition.

In the preferred embodiment, the display means 18 includes first and second displays 20,22, and the processor means 14 delivers respective first and second display control signals to the displays 20,22. The first display 20 is adapted for receiving the first display control signal and sequentially providing a visual indication of upper and lower limits for each sensed parameter which is in an undesirable operating condition and the current relative magnitude of the sensed parameter with respect to the respective upper and lower limits. The first display 20 includes a fixed format liquid crystal display (LCD) 24 which receives the first display control signal from the processor means via a first electrical conductor 23. Preferably the first electrical conductor 23 is a serial data interface implemented using the serial peripheral interface of Motorola's MC68HC11 micro-computer. It should be understood that numerous other types of displays could be used for the first display 20, such as a dot matrix LCD, a vacuum fluorescent display, a plasma display, or an electro-mechanical display.

Referring now to FIGS. 2A–B, the fixed format LCD 24 will be discussed in greater detail. FIG. 2A shows the various segments which can be energized on the LCD 24, whereas FIG. 2B illustrates the LCD 24 when a parameter is being displayed. The fixed format LCD 24 includes a plurality of radially oriented segments 25 which form a dial indicator 26. The processor means 14 selectively energizes individual segments 25 to indicate the relative magnitude of the sensed parameters having undesirable operating conditions. The first display 20 is capable of displaying a range of values for a given sensed parameter between upper and lower limits, where the upper and lower limits correspond respectively to the first and last radially oriented segments 28,30. The magnitude of the upper and lower limits and the range of values between them vary in accordance with the parameter currently being displayed. For example, in the case of engine temperature, the lower and upper limits could be assigned values of 25° C. and 100° C., respectively. Whereas, in the case of hydraulic fluid pressure, the lower and upper limits could correspond to 700 psi and 5000 psi, respectively. The processor means 14 accesses an empirically determined lookup table stored in memory for determining which segment should be energized to display the parameter's magnitude. For some of the parameters, the range of values are displayed linearly on the first display 20. For such parameters the value of each radially oriented segment is represented by the equation SEG=(UL−LL)/N, where SEG represents the value of an individual segment for a given parameter in terms of the parameter signal, UL represents the upper limit, LL represents the lower limit, and N represents the number of radially oriented segments 25. However, in many instances, it is desirable to use a nonlinear approach in operating the first display 20 so as to increase the display's resolution over certain portions of a parameter's operating range. This is especially desirable if the amount of damage done by an incremental increase in a parameter is not linear. For example, in the case of engine operating temperature, it may be desirable to have each segment correspond to 10° C., 5° C., 3° C. and 1° C. during normal operation, warning level 1, warning level 2, and warning level 3, respectively. It should also be recognized that while the first display 20 has been illustrated as a dial-type indicator numerous other forms of indicators, such as a bar-type indicator, could be used for this function without departing from the scope of the present invention.

The first display 20 is also provided with first and second critical range segments 32,34 which are selectively energized in response to the parameter being displayed on the first display 20. The first and second critical range segments 32,34 are similar to the "red-line" on an automobile tachometer and are provided for indicating if the parameter enters an undesirable condition when the respective parameter goes low or high. The processor means 14 again accesses a lookup table in memory to determine which of the segments 32,34 should be activated for each displayed parameter. For example, the first critical range segment 32 could be activated when engine oil pressure is displayed for indicating that serious damage will occur if oil pressure falls into that region.

The first display 20 further includes a semicircular segment 36 and first, second and third arc-shaped segments 38*a*–*c*, all of which are energized any time a parameter is displayed. The semicircular segment 36 is purely aesthetic and is provided give the first display 20 a more realistic representation of a dial-type indicator. The second arc-shaped segment 38*b* further includes a midpoint marker 40 for indicating the midway point between first and last radially oriented segments 28,30 and thus the lower and upper limits respectively. First and second deenergized regions 42*a*,42*b* are provided between the first and second arc-shaped segments 38*a*,38*b* and the second and third arc-shaped segments 38*b*,38*c*, respectively, at one fourth and three fourths the distance between the first and last radially oriented segments 28,30. The arc-shaped segments 38*a*–*c*, deenergized regions 42*a*–*b*, and midpoint marker 40 enable the operator to more readily determine the relative magnitude of the displayed parameter.

The second display 22 is adapted for simultaneously providing a textual message associated with the parameter displayed on the first display 20. The textual message provided consists of two parts. The first part of the message indicates parameter currently displayed on the first display 20 as well as the parameter's condition. For example the message could read "Low Fuel." The second part of the message indicates what action should be taken to correct the undesirable operating condition of the displayed parameter. The second display 22 is in the form of dot matrix display 43 of the LCD type. The second display 22 preferably capable of displaying two lines of text of twenty characters each for displaying the first and second parts of the textual massage, respectively. When the processor means 14 delivers the first display control signal to the first display 20 it simultaneously delivers the second display control signal to the second display 22 for driving the dot matrix display in a conventional manner. For this purpose, the processor means 14 is connected to the dot matrix display 43 by a second electrical conductor 44. Communication between the processor means 14 and the dot matrix display 43 can be achieved by either a command code (i.e. turn pixel n ON/OFF) or by character code (i.e. ASCII) being delivered via the second electrical conductor. It is foreseeable that other methods of communication could be utilized without departing from the scope of the immediate invention.

When a parameter is to be displayed on the first display 20 the processor means 14 accesses a lookup table in memory to determine the appropriate message to be displayed on the dot matrix display 43 and responsively generates a corresponding bit map which is used to drive the display 43. For example, in the event of low oil pressure, the first part of the message could read "LOW OIL PRESSURE" and the second part of the message could read "STOP VEHICLE." It should be noted that the display can easily be configured for different languages by varying the lookup table. Furthermore, it is foreseeable that longer and more complex messages could be displayed by scrolling the message across the dot matrix display.

It is also understandable that it might be desirable to display warning messages even when no parameter is displayed on the first display 20. For example, if an electrical fault is detected with a particular sensor means 12, the operator should be notified of this fault. However, the parameter signal provided by the faulty sensor means 12 would be inaccurate and hence it should not be displayed on the first display 20. It should be pointed out the a single display, such as a dot matrix display, could be utilized for performing the functions of the first and second displays 20,22.

The above process is repeated for each parameter having an undesirable condition equal to the current vehicle warning level. In this manner, the vehicle operator is provided with a visual indicator and the relative magnitude of the parameters having the most critical undesirable operating conditions.

The monitoring system can also be operated in an "ON DEMAND" mode which is only operative when no undesirable operating conditions are present. More specifically, a selector means 46 is provided to enable the operator to select a parameter to be displayed on the display means 18 in the absence of any undesirable operating condition. It is foreseeable that a plurality of selected parameters could be sequentially displayed in this mode with only minor modifications to the monitoring system 10. The selector means 46 could take numerous embodiments such as a multiposition switch wherein each position corresponds to a different parameter. However, in the preferred embodiment the selector means 46 is in the form of a key pad 47 which enables the operator to select a parameter to be displayed on the display means 18.

The key pad includes enable button 48 for producing an enable signal indicating that the operator wants to select a parameter to be displayed on the display means 18. If no undesirable operating conditions are detected, the processor means 14 repeatedly checks to see if the enable signal is being produced. Upon detecting the production of the enable signal, the processor 14 means enters a parameter selection routine. More particularly, the processor means 14 begins to sequentially display the parameter names on the dot matrix display 43. For this purpose, the processor means 14 includes a lookup table for having the names of all the parameters stored in a sequential manner. The processor means 14 generates a bit map corresponding to the first parameter name and responsively delivers a display control signal to the dot matrix display 43, thereby causing the parameters name to be displayed. The processor means 14 produces the second display control signal for a predetermined period of time and then repeats the process for the next parameter in the lookup table.

A selector button 52 is provided to enable the operator to indicate which parameter is to be displayed. More specifically when the name of the desired parameter appears on the dot matrix display 43, the operator presses the selector button 52 causing an selection signal to be delivered to the processor means 14. The processor means 14 detects the production of the selection signal and sets a demand mode flag in memory in accordance with the operator's selection. Upon selection of a parameter by the operator, the processor means 14 exits the parameter selection routine. The key pad also includes up and down buttons 54,56 to enable the operator to respectively command the the previous or next parameter name be displayed on the dot matrix display 43.

If no undesirable operating conditions are detected, the processor means 14 accesses the demand mode flag to determine which parameter is to be displayed on the display means 18. More specifically, the processor means 14 accesses a lookup table to determine the textual message to be displayed on first line of the dot matrix display 43. The lookup table provides the name of the parameter for which the demand flag is set. The magnitude of the sensed parameter, as indicated by the parameter signal, is displayed in numeric form on the second line of the dot matrix display 43. The processor means 14 generates a corresponding bit map which is used to drive the dot matrix display 43. The first display 20 is operative for providing a visual indication of the relative magnitude of the selected parameter in a manner as set forth above.

Referring now to FIGS. 3A–B, a functional software flowchart for one embodiment of the present monitoring system will be discussed. The flowchart can be utilized in programming the processor means 14 to perform certain aspects of the present invention.

Initially, in the block 200 the parameter signals are read from the various sensor means 12. As mentioned previously, the parameter signals can include, but are not limited to, pulse width modulated (PWM), frequency, and analog signals. Next, in the block 205, diagnostics are performed on the parameter signals to detect electrical faults such as harness faults, shorts to ground and battery, and sensor faults. Such diagnostics are common in the art and will not be explained in great detail. It is foreseeable that these diagnostic could be performed using either software or hardware; however, in the preferred embodiment, all such diagnostics are embodied in software. Faulty data flags are set in memory in accordance with the detected faults for use later in the programs. The faulty data flags indicate that a respective parameter signal is invalid and should not be used later in the programs for detecting undesirable operating conditions in the corresponding sensed parameter. Control is then passed to the block 210 where the parameter signals are filtered to reduce the likelihood of erroneously recording an electrical fault when no fault is present. The filtering is achieved using software filtering as is common in the art.

Thereafter, in the block 215 all of the valid parameter signals are converted into 16-bit, signed numbers via a lookup table stored in memory. More specifically, only the parameter signals for which a faulty data flag has been set are converted to 16-bit, signed numbers. This conversion is done so that all of the parameter signals are in a standard format. The parameter signals are initially converted into digital numbers when they are read from the various sensor means 12 in the block 200. However, at that point the parameter signals are of various bit sizes owing to the various sensors used. The lookup table provides 16-bit, signed number corresponding to the current magnitude of the respective parameter as indicated by the parameter signal.

Control is then passed to the block 220 where diagnostic are performed on the converted parameter signals to determine if the parameter signals indicate that the respective parameters are in undesirable operating conditions. Again, diagnostics of this type are common in the art and, therefore, will not be explained in great detail herein. An example of such a diagnostic would be to examine the parameter signal corresponding to engine temperature to determine if the engine overheating. As mentioned above, three different warning levels are used in response to the criticality of an undesirable operating conditions. For example, safe engine operating temperatures could range between 25° C. and 100° C. While warning levels 1, 2 and 3 could correspond to temperatures of 101°–110° C., 111°–120° C. and greater than 120° C. If an undesirable condition is detected for a parameter, a parameter warning level flag is set in memory indicating the level of the undesirable operating condition for the respective parameter. This process is repeated for all the parameter signals, and then control is passed to the block 225.

In the block 225, the parameter warning level flags are examined to determine if any undesirable operating conditions exist. If no flags are set, control is passed to the block, thereby enabling the display means 18 to operate in the "On Demand" mode. However, if undesirable operating conditions exist, control is passed to the block 230 where the processors means 14 examines the parameter fault flags to determine the highest warning level present. The processor means 14 sets a vehicle warning level flag equal to the highest detected warning level. As mentioned previously, only parameters having a warning level equal to the vehicle warning level are displayed on the display means 18. This is done since the operator is typically concerned with the most critical faults. However it would be possible to record all of the faults in a fault logger consisting of RAM, as is common in the art. The contents of the RAM could be downloaded into an off-board computer or diagnostic tool for analysis by a repair technician.

Next, control is passed to the block 235 to start the sequential display of the parameters having parameter warning level flags equal to the vehicle warning level flag. More specifically, in the block 235, the processor means 14 accesses a lookup table in memory to determine the textual message to be displayed on the second display 22 for the parameter to be displayed. The processor means 14 responsively generates a bit map corresponding to the textual message and the bit map is used to drive the dot matrix display 43 in a conventional manner. Next, in the block 240, the segment to be activated on the fixed format LCD 24 is determined in response to the parameter signal, as explained above. Finally, in the block 245, the first and second display control signals are delivered to the first and second display means 20,22, respectively, in accordance with steps 235 and 240.

The first and second displays remain energized for a predetermined period of time after which steps 235–245 are repeated for each parameter having parameter warning level flags equal to the vehicle warning level flag.

If in the block 225, it is determined that no parameter warning level flags are set, control is passed to the block 250 to determine if the operator has requested the "ON DEMAND" mode. More specifically, the processor means 14 determines if the demand mode flag has been set and for which parameter it has been set. If the the demand flag is not set, the program is exited and no display control signal is delivered to the display means 18. However, if the demand flag is set for a parameter, control is passed to the block 255 where the processor means 14 accesses a lookup table in memory to determine what textual message should be displayed on first line of the dot matrix display. The lookup table provides the name of the parameter for which the demand flag is set. Next, in the block 260, the parameter signal for the selected parameter is converted to a numerical value for display on the second line of the dot matrix display. Control is passed to the block 270 where the parameter signal for the selected parameter is converted into a segment location for display on the first display 20. The first and second display control signals are then respectively delivered to the first and second displays 20,22 in accordance with steps 255–260. The parameter is displayed until a fault is detected or the operator turns the "ON-DEMAND" mode off. It is foreseeable that the program could easily be modified to enable the display news to sequentially display a plurality of parameters during the "ON-DEMAND" mode.

Other aspects and advantages can be obtained from a study of the drawings disclosure and appended claims.

INDUSTRIAL APPLICABILITY

Assume that a vehicle, such as a wheel loader, has a plurality of sensor means for sensing separate vehicle parameters and producing respective parameter signals. Included in these sensor means is an engine temperature sensor which produces engine speed and fluid pressure signal, respectively. The parameter signals, including the engine speed signal, are delivered to the processor means 14 which performs diagnostic to determine if the parameter signals indicate that the respective parameters are in undesirable operating conditions.

Assume that at some point during operation of the vehicle, the engine temperature signal indicates that the engine is too hot. The processor will detect this condition and set a parameter warning level flag in memory indicating that the engine is in an overheat condition. The parameter flag also indicates the warning level assigned to the overheat condition. As mentioned above, three different warning levels are used in response to the criticality of an undesirable operating conditions. Therefore, it is possible to assign the different warning levels to the engine overheat condition in accordance with the sensed engine temperature. Assume that the sensed overheating condition is a warning level 1.

The processor means 14 sets the vehicle warning level flag to warning level 1 in response to the warning level of the engine overheat condition. As mentioned above, the vehicle warning level is set equal to the highest detected warning level and only parameters having warning levels equal to the vehicle warning level are displayed on the display means 18. The processor means 14 then accesses a lookup table in memory to determine the textual message to be displayed on the second display 22 for the engine overheat condition. The processor means 14 responsively generates a bit map corresponding to the textual message. Next, the segment to be activated on the fixed format LCD 24 is determined in response to the engine temperature signal. Finally, in the first and second display control signals are delivered to the first and second display means 20,22, respectively. The dot matrix display 43 responsively displays a textual message indicating that the engine is in an overheat condition, and the appropriate segments on the fixed format LCD 24 are energized to indicate the relative magnitude of the sensed engine temperature.

We claim:

1. An apparatus for monitoring a plurality of different parameters related to the operating condition of an engine powered device, comprising:

a plurality of sensors each sensing a different one of the plurality of operating parameters of the engine powered device and each producing a parameter signal representative of the parameter being sensed;

processor means for receiving said parameter signals, processing each of said parameter signals and determining which ones of the parameter signals are at an undesirable operating condition, classifying each parameter signal having an undesirable operating condition into one of a preselected number of warning levels with respect to the severity of said undesirable operating condition, selecting those classified parameter signals being at the highest warning level, and producing a sequence of individual display control signals at spaced time intervals of those parameter signals having the highest warning level, each display control signal of the sequence of display control signals being related to a particular one of only the classified parameters having the highest warning level; and a first display having a plurality of selectively energizable segments arranged in a preselected pattern and being connected to said processor means, said first display receiving said sequence of display control signals and energizing a selected one of said plurality of segments corresponding to the individual display signal being received at that time in the sequence and visually indicating the magnitude of the individual sensed parameter.

2. An apparatus, as set forth in claim 1, wherein said plurality of selectively energizable segments are radially oriented.

3. The apparatus, set forth in claim 2, wherein said first display including means for providing a visual indication of an upper and a lower limit of the sensed parameter being shown on said first display.

4. The apparatus set forth in claim 3 wherein said display means further includes:

a second display adapted to simultaneously provide a textual message associated with the parameter displayed on said first display.

5. The apparatus, set forth in claim 2, wherein said energizable segments being a liquid crystal display.

6. The apparatus, set forth in claim 5, wherein said energizable segments being arranged to form a bar graph.

7. The apparatus, set forth in claim 5, wherein said energizable segments being arranged to form a dial indicator.

8. An apparatus, as set forth in claim 2, said display means further including a second display adapted to indicate the parameter being currently displayed on said first display and the action to be taken with respect to the parameter being displayed on the first display.

9. A method for monitoring the operating condition of a vehicle of the type having a plurality of sensor means for sensing different vehicle parameters and producing respective parameter signals responsive to said different sensed parameters, comprising the steps of:

processing each of said parameter signals and determining which ones of the associated sensed parameters is at an undesirable operating condition;

classifying each of said parameters at an undesirable operating condition into one of a preselected number of hierarchical warning levels in accordance with the severity of said respective undesirable operating condition;

determining the highest warning level of the classified parameters;

producing a sequence of individual display control signals corresponding to those parameter signals having the highest warning levels, each individual display control signal of said sequence of display control signals being produced at a different time during said sequence; and providing sequentially on a first display a visual indication of the relative magnitude of the sensed parameters being at the highest current warning level in response to receiving said sequence of individual display control signals, only the magnitude of one sensed parameter of a plurality of sensed parameters at the highest current warning level being displayed at a time.

\* \* \* \* \*